US012115629B2

(12) United States Patent
Boccellato et al.

(10) Patent No.: US 12,115,629 B2
(45) Date of Patent: Oct. 15, 2024

(54) ELECTRONIC TORQUE WRENCH WITH DETECTION OF INCORRECT USE

(71) Applicant: SCS CONCEPT S.R.L., Cusano Milanino (IT)

(72) Inventors: Roberto Boccellato, Seriate (IT); Carlo Giuseppe Tinti, Noviglio (IT)

(73) Assignee: SCS CONCEPT S.R.L., Cusano Milanino (IT)

( * ) Notice: Subject to any disclaimer, the term of this patent is extended or adjusted under 35 U.S.C. 154(b) by 249 days.

(21) Appl. No.: 17/628,651

(22) PCT Filed: Jul. 24, 2020

(86) PCT No.: PCT/IB2020/056991
§ 371 (c)(1),
(2) Date: Jan. 20, 2022

(87) PCT Pub. No.: WO2021/019393
PCT Pub. Date: Feb. 4, 2021

(65) Prior Publication Data

US 2022/0395969 A1 Dec. 15, 2022

(30) Foreign Application Priority Data

Jul. 26, 2019 (IT) ........................ 102019000013077

(51) Int. Cl.
*B25B 23/14* (2006.01)
*B25B 23/142* (2006.01)

(52) U.S. Cl.
CPC ................................ *B25B 23/1425* (2013.01)

(58) Field of Classification Search
CPC .................................................. B25B 23/1425
See application file for complete search history.

(56) References Cited

U.S. PATENT DOCUMENTS 6,070,506 A * 6/2000 Becker ................ B25B 23/1425 81/479
8,234,936 B2 * 8/2012 Nakata ................ B25B 23/1425 81/479
(Continued)

FOREIGN PATENT DOCUMENTS

DE 3139374 A1 4/1983
EP 1710051 A2 10/2006
(Continued)

OTHER PUBLICATIONS

International Search Report for PCT Application No. PCT/IB2020/056991. Mail Date: Oct. 16, 2020. 1 page.

*Primary Examiner* — David J Bolduc
(74) *Attorney, Agent, or Firm* — Perkins Coie LLP; Sean Lee; Viola T. Kung

(57) ABSTRACT

An electronic torque wrench (10) comprises a body with an axial extension along a longitudinal axis (11), a front end provided with a coupling (14) intended to engage the wrench on a joint to be tightened by manual rotation around a rotation axis (15) which is transverse to the longitudinal axis (11), and a handle (13) along the body for operating the wrench. A sensor (16) is intended to detect a torque applied with the wrench to the coupling (14) and comprises two flex sensor elements (16*a* and 16*b*) which are arranged spaced apart along the longitudinal axis (11). An electronic control circuit (17) is connected to the sensor (16) for receiving signals from it and is intended to implement a method which comprises the steps: calculating, depending on flexing values detected by the two sensor elements (16*a* and 16*b*), the point P along the longitudinal axis (11) which is used for applying the manual force of rotation of the wrench about the rotation axis (15); comparing the position of the point P with admissible predefined positions along the longitudinal
(Continued)

axis (11); and emitting an error signal if the position of the point P does not correspond to these admissible positions.

10 Claims, 2 Drawing Sheets

(56) References Cited

U.S. PATENT DOCUMENTS

| | | | | |
|---|---|---|---|---|
| 2006/0225519 | A1* | 10/2006 | Nakagawa | B25B 23/1425 73/862.22 |
| 2009/0071300 | A1* | 3/2009 | Rainone | B25B 23/1425 81/479 |
| 2009/0260491 | A1* | 10/2009 | Rainone | B25B 23/1425 81/479 |
| 2009/0266206 | A1* | 10/2009 | Hsu | B25B 23/1425 81/479 |
| 2010/0206141 | A1* | 8/2010 | Nakata | B25B 23/1425 81/479 |
| 2011/0132157 | A1* | 6/2011 | Duvan | B25B 23/1425 81/479 |
| 2011/0185863 | A1* | 8/2011 | Hsieh | B25B 23/142 81/479 |
| 2013/0263707 | A1* | 10/2013 | Hsieh | B25B 23/1425 81/467 |
| 2016/0031070 | A1* | 2/2016 | Ball | B25B 23/1427 81/479 |
| 2017/0095911 | A1* | 4/2017 | Hsieh | G01L 25/003 |
| 2020/0298384 | A1* | 9/2020 | Reeder | B25B 23/141 |
| 2020/0398410 | A1* | 12/2020 | Chiang | B25B 23/141 |
| 2021/0146513 | A1* | 5/2021 | Banzola | G06K 7/1413 |
| 2021/0260736 | A1* | 8/2021 | Lin | B25B 23/1425 |
| 2021/0350588 | A1* | 11/2021 | Tanida | G06T 19/00 |
| 2022/0193870 | A1* | 6/2022 | Jiries | B25B 23/1425 |

FOREIGN PATENT DOCUMENTS

| | | | |
|---|---|---|---|
| EP | 2168726 | A1 | 3/2010 |
| FR | 2841650 | A1 | 1/2004 |

* cited by examiner

ELECTRONIC TORQUE WRENCH WITH DETECTION OF INCORRECT USE

This application is a National Stage of International Application PCT/IB2020/056991, filed Jul. 24, 2020; which claims the priority of Italian Application No. 102019000013077, filed Jul. 26, 2019. The contents of the above-identified applications are incorporated herein by reference in their entireties.

The present invention relates to an innovative electronic torque wrench.

In the prior art electronic wrenches for performing the manual tightening of threaded joints (for example bolts) by means of rotation are known.

These wrenches are generally made with a long body provided with a handle for gripping the wrench and have a free front end which is provided with a suitable coupling for engaging the wrench on the joint to be rotated.

These wrenches have torque sensors and electronic circuitry which, depending on the detection performed by the sensors, show on the display the tightening torque applied to the joint by means of the wrench.

The wrench may optionally also comprise a rotation sensor for detecting also the tightening angle and for correlating it to the torque applied to the joint.

For correct calculation of the torque it is obviously important for the wrench to be correctly used by the user. It is, for example, particularly important that the point of application of the rotation force of the wrench should be correct, namely that the user should grip the wrench in the correct position.

In the prior art some solutions have been proposed where it is attempted to overcome possible incorrect use, but in any case these solutions have not proved to be satisfactory. For example, the zone for correct gripping of the wrench is highlighted so that the user is induced to grip the wrench only in this zone. However, if the user grips the wrench in a different position, the wrench is unable to detect this and to signal the error.

The general object of the present invention is to provide an electronic wrench which automatically detects conditions of incorrect use and signals them in good time to the user.

In view of this object the idea which has occurred, according to the invention, is to provide a control method in an electronic torque wrench, the wrench comprising: a body with an axial extension along a longitudinal axis; a front end provided with a coupling intended to engage the wrench on a joint to be tightened by means of manual rotation around a rotation axis which is transverse to the longitudinal axis; a handle along the body for operating the wrench; a sensor for detecting a torque applied with the wrench to the coupling and comprising two flex sensor elements which are arranged spaced apart along the longitudinal axis; an electronic control circuit which is connected to the sensor for receiving signals from it; the method comprising the steps of: calculating, depending on flexing values detected by the two sensor elements, the point P along the longitudinal axis which is used for application of the manual force of rotation of the wrench about the rotation axis; comparing the position of the point P with admissible predefined positions along the longitudinal axis; emitting an error signal if the position of the point P does not correspond to these admissible positions.

Moreover, the idea has occurred to provide, according to the invention, also a wrench with an electronic circuit configured to carry out the aforementioned method.

In order to illustrate more clearly the innovative principles of the present invention and its advantages compared to the prior art, examples of embodiment applying these principles will be described below with the aid of the accompanying drawings. In the drawings.

Figure 1:
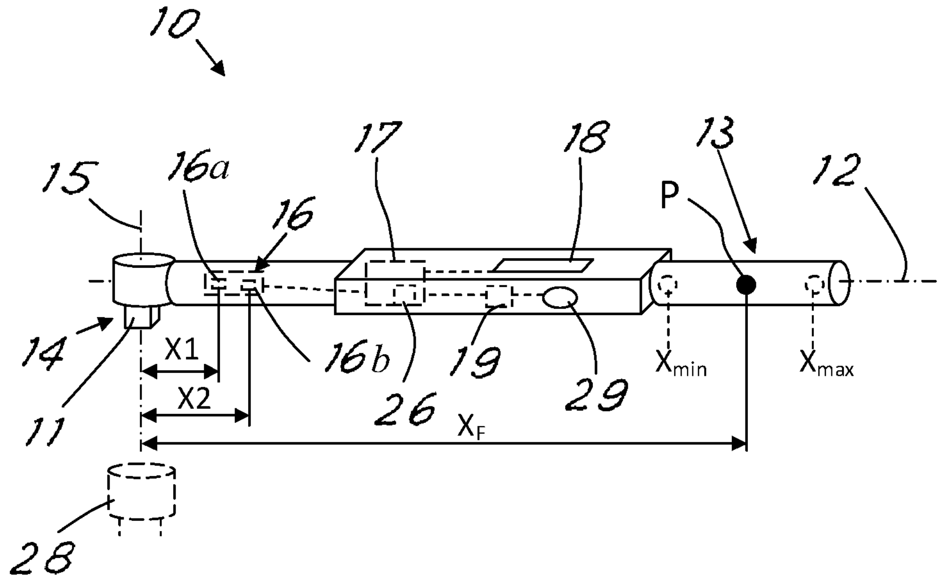
FIG. 1 shows a schematic perspective view of an electronic wrench applying the principles of the invention.

With reference to the figures, FIG. 1 shows an electronic torque wrench according to the invention, denoted generally by 10.

The wrench 10 has a long body with a mainly axial extension along a main longitudinal axis 12. The body 12 defines externally a handle 13 for gripping and manually rotating the wrench during use. The handle is situated advantageously close to a rear end of the wrench. If required, the handle 13 may also be shaped laterally for convenient gripping with one hand and also covered with suitable relatively soft material (such as rubber), as may be easily imagined by the person skilled in the art.

At a front end of the wrench there is a coupling 14 intended to engage a threaded joint 28 (not shown in detail) to be tightened by means of rotation of the wrench about a second rotation axis 15 (which is made to coincide with the rotation axis of the threaded joint) which is transverse to the main axis 12 of the wrench.

The coupling 14 is advantageously provided with an interchangeable insert 11 for adapting the wrench to the joint which is to be tightened, according to a technique known per se and not further shown or described here.

For example, the insert may have a known hexagonal seat for receiving the head of the joint (for example the head of a bolt) with a corresponding hexagonal shape.

Between the handle 13 and the coupling 14 the wrench comprises a known flex sensor 16 (for example using resistance strain gauges) for detecting the flexing of the wrench, said flexing depending on the torque which is applied to the coupling with the wrench.

An electronic control circuit 17, known per se, located in the wrench will receive the signal produced by the sensor 16 and will calculate from it the torque applied with the wrench and will show it on a suitable display 18, using a technique which is substantially known and therefore will not be further described here in detail. The wrench may also comprise an acoustic signalling device 19 (for example a loudspeaker or a buzzer) connected to the circuit 17 for emitting sounds upon operation.

Preferably, the wrench may also comprise a known gyroscopic sensor 19 for detecting the rotation angle of the wrench around the rotation axis 15 and transmitting it to the electronic control circuit 17, for example so as to allow it to calculate and if necessary show on the display the information relating to the torque detected depending on the rotation angle of the wrench and, therefore, of the joint to which the torque is applied.

The sensor 16 is formed by two flex sensor elements 16*a* and 16*b* (advantageously strain gauges, for example connected in a measuring bridge) so as to measure flexing of the wrench at two points $X_1$ and $X_2$ which are spaced apart along the main axis of the wrench. The mutual spacing of the two elements 16*a* and 16*b* will depend for example on the sensitivity of the sensor elements, as will be explained below, so that the two sensors may detect with suitable precision the difference in flexing due to the different distance from the axis 15.

As is known, in fact, the bending of a beam fixed at one end and with a force applied at a point along it is proportional to the distance along the beam from the fixing point. Moreover, the bending moment varies along the beam with the progression of the bending and is a straight line with moment equal to zero at the point where the force is applied and maximum moment at the fixed end. In the case of a wrench this maximum moment is the torque applied to the joint being tightened.

For example, let is consider for sake of simplicity a Cartesian plane with the axis X coinciding with the axis 12 and having its origin in the insert (namely where the rotation axis 15 intersects the main axis 12). The positions on the axis X of the two sensor elements 16*a* and 16*b* are indicated respectively by $X_1$ and $X_2$. All this is shown in schematic form by way of example in FIG. 1.

Figure 2:
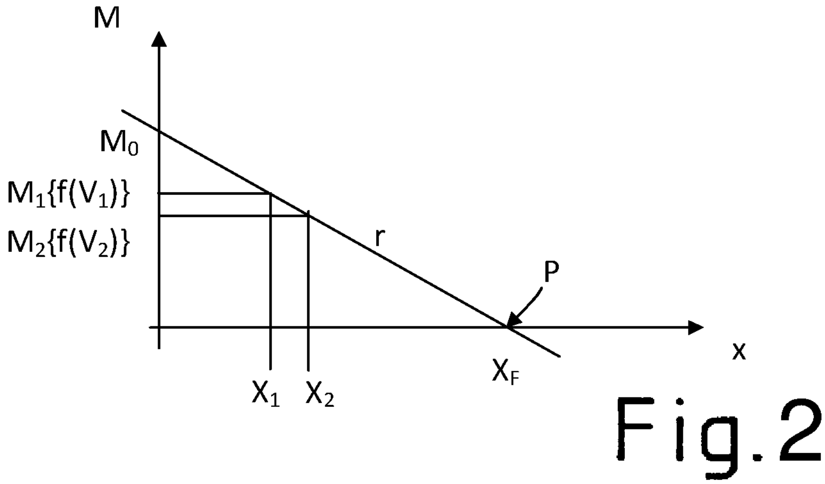
FIG. 2 shows a schematic graph of a possible progression of the bending moment along the axis of the wrench.

Knowing the positions $X_1$, $X_2$ of the two sensor elements 16*a* and 16*b*, the electronic control circuit (for example a suitably programmed microprocessor system known per se) may calculate the moment $M_0$ applied by the wrench to the joint based on the flexing values $V_1$ and $V_2$ detected by the two sensor elements 16*a* and 16*b*, which are suitably calibrated in order to determine the proportionality M=f(V) between the values detected by the sensor elements and the moment M. This is schematically shown in the graph of FIG. 2 which shows, by way of example, a straight line r which represents the progression of the moment M as a function of X along the wrench.

The point P (i.e. where M=0) is the point of application of the force, namely the point where the user's hand grips the handle 13 in order to rotate the wrench about the axis 15.

The electronic control circuit 17 may therefore calculate, based on the values $V_1$ and $V_2$ detected by the two sensor elements in the positions $X_1$ and $X_2$, the straight line which passes through the two points which depend on these values $V_1$ and $V_2$. This straight line will intersect the axis X at the point where M=0 and $x=X_F$. $X_F$ corresponds to the position of the point P where the user's hand is positioned in order to rotate the wrench.

Once the position $X_F$ of the point P has been calculated, the electronic control circuit 17 may compare this position with position values of the hand which are considered correct for correct use of the wrench. In other words, the electronic control circuit 17 checks whether $X_F$ is among values or range of values considered acceptable for correct use of the wrench. These acceptable values may for example be defined as a range of values between a value $X_{min}$ and a value $X_{max}$.

For example, $X_{min}$ and $X_{max}$ may advantageously correspond to the two opposite ends of the handle 13 where it is still possible to comfortably position the hand in order to rotate the wrench, as schematically shown in FIG. 1. These values will depend obviously on the actual structure of the wrench used and may be determined a priori, for example by means of tests for use of the wrench or as a design parameter of the wrench.

The electronic control circuit 17 may advantageously comprise an electronic memory 26 inside which the positions or the limit values of a range of admissible predefined positions along the longitudinal axis for the point P are stored. The circuit 17 may thus carry out a comparison with the values contained in this memory.

In any case, if the position P is acceptable (namely, for example if $X_{min} \leq X_F \leq X_{max}$) the wrench will continue with its normal operation, for example showing the value of $M_0$ applied to the insert and optionally the rotation angle. In order to achieve this, the method according to the invention may envisage calculating, depending on flexing values detected by the two sensor elements 16*a* and 16*b*, the rotation torque applied with the wrench to the coupling 14. After this, the calculated torque value may be displayed on the display of the wrench body.

If the position of P is not acceptable (i.e. if the position of P is not among the positions considered acceptable, for example is not in the range between $X_{min}$ and $X_{max}$) the wrench may emit an error signal, for example an acoustic error signal by means of the acoustic signalling device 27 and/or an optical signal, for example, an error message on the display.

The user, thus alerted, may move his/her hand into the correct position. The wrench will detect this movement as a change of the point P which has been recalculated, will repeat the test and, if the point P is now correct, will continue with the measurements. If the point P is not correct, it will emit an error signal again, and so on.

Advantageously, the error signal may contain the information which defines whether the position of the point P is situated before or after the range of admissible positions along the longitudinal axis 11 with respect to the front end of the wrench. In this way the wrench may also show information for indicating to the user the direction in which the hand must be moved.

For example, if $X_F < X_{min}$ the wrench may signal to the user to move his/her hand towards the rear end of the wrench (i.e. towards the right in FIG. 1). If, instead, $X_F > X_{max}$ the wrench may signal to the user to move his/her hand towards the front end of the wrench (namely to the left in FIG. 1). The information regarding the incorrect position and therefore the corresponding signal may for example be provided by the wrench which shows an arrow pointing in the direction towards which the hand must be moved on the wrench in order to bring the point P back within the correct range of positions.

Figure 3:
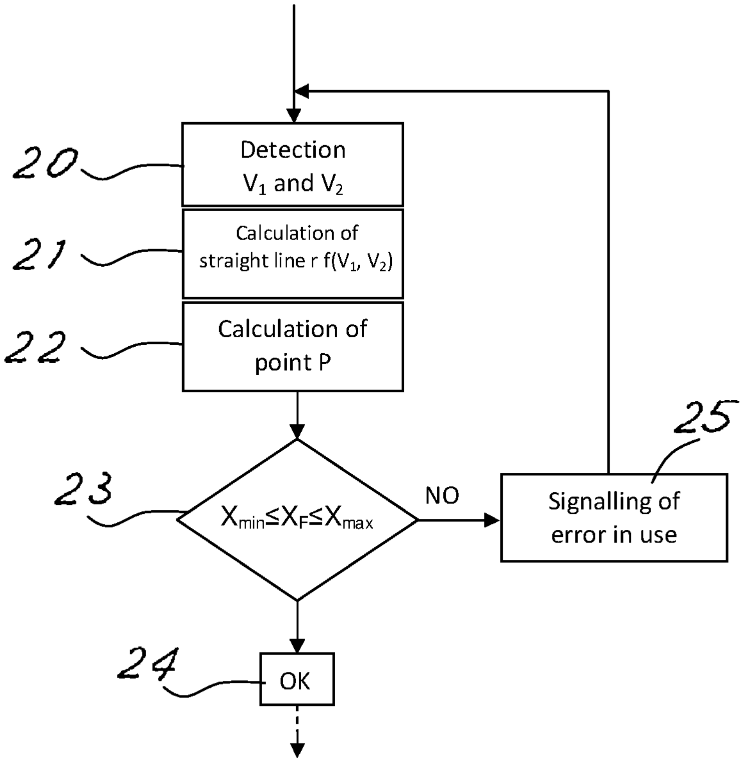
FIG. 3 shows a possible block diagram for operation of the wrench according to the invention.

By way of example, FIG. 3 shows a possible block diagram relating to application, in the wrench, of the method according to the invention. This diagram may be for example the flow diagram of the part of the program for checking the position of the hand, contained in a program which is stored in the microprocessor of the electronic circuit 17 for operation of the wrench.

Basically, when measurement of the torque is started, the wrench detects in step 20 the values $V_1$ and $V_2$ provided by the sensor elements 16*a* and 16*b* and calculates in step 21 the straight line which is a function of these values, namely $r=f(V_1, V_2)$, and then in step 22 the point P where the straight line r intersects the axis X, namely the position $X_F$ of the hand.

This is then followed in step 23 by a comparison with the values of the admissible positions, for the values $X_{min}$ and $X_{max}$ within a range of admissible positions. Depending on the outcome of the comparison, the wrench decides whether the position of the hand is correct (and in this case continues in step 24 with the measurement and display operations (basically known and therefore not described here in detail) or, if this is not so, signals in step 25 the error in positioning of the hand and returns to step 20 in order to check again the values $V_1$ and $V_2$ and the position P of the hand. The entire procedure is repeated until the position P of the hand is correct.

At this point it is clear how the objects of the invention have been achieved, providing an electronic wrench and a control method which allow the detection and signalling of incorrect conditions of use of the wrench.

Basically the method according to the invention envisages calculating, depending on flexing values detected by the two sensor elements 16*a* and 16*b*, the point P along the longitudinal axis 11 which is used for application of the manual force of rotation of the wrench about the rotation axis 15. Following this calculation, the position of the point P is compared with admissible predefined positions along the longitudinal axis 11 and an error signal is emitted if the position of the point P does not correspond to these admissible positions.

As mentioned above, the positions considered admissible may be a range of positions $X_{min}$-$X_{max}$ along the longitudinal axis (11).

Advantageously, the range of positions may be contained in the handle of the wrench.

Obviously the above description relating to application of the innovative principles of the present invention is provided by way of example of these innovative principles and must therefore not be regarded as limiting the scope of the rights claimed herein. For example, the wrench may have a structure different from that shown, for example, for transmission of the tightening data to an external control unit, instead of displaying said data on its own display. The error signal may also be produced by means of indicator lamps on the wrench, instead of using symbols or text on a graphics display, and by means of various acoustic signals, as may be now easily imagined by the person skilled in the art.

Moreover, the wrench may be provided with various further functions known per se for this type of tool, such as indication of the start and end of the measurement operation, reaching of a pre-set tightening value, the charged state of an internal electric battery (if present for powering thereof), the presence of a connection with an external unit, automatic detection of the type of removable insert engaged in the wrench, and changes in the measurement produced by this insert for automatic correction thereof, etc.

The invention claimed is:

1. A control method in an electronic torque wrench (10), the wrench (10) comprising:

- a body with an axial extension along a longitudinal axis (11);
- a front end provided with a coupling (14) intended to engage the wrench on a joint to be tightened by manual rotation around a rotation axis (15) which is transverse to the longitudinal axis (11);
- a handle (13) along the body for operating the wrench;
- a sensor (16) for detecting a torque applied with the wrench to the coupling (14) and comprising two flex sensor elements (16*a* and 16*b*) which are arranged spaced apart along the longitudinal axis (11);
- an electronic control circuit (17) which is connected to the sensor (16) for receiving signals from it;

the method comprising the steps of:

- calculating, depending on flexing values detected by the two sensor elements (16*a* and 16*b*), the point P along the longitudinal axis (11) which is used for applying the manual force of rotation of the wrench around the rotation axis (15);
- comparing the position of the point P with admissible predefined positions along the longitudinal axis (11);
- emitting an error signal if the position of the point P does not correspond to these admissible positions.

2. The method according to claim 1, characterized in that the positions considered admissible are a range of positions along the longitudinal axis (11).

3. The method according to claim 2, characterized in that the range of positions along the longitudinal axis (11) is contained in the handle (13).

4. The method according to claim 2, characterized in that the error signal contains the information relating to the position of the point P situated before or after the range of positions along the longitudinal axis (11) with respect to the front end of the wrench.

5. The method according to claim 4, characterized in that said information is displayed on the body of the wrench in the form of arrows pointing in the direction along the longitudinal axis (11) towards which the hand must be moved along the wrench to bring the point P back within the range of positions.

6. The method according to claim 1, characterized in that the error signal is shown on a display on the body of the wrench and/or is indicated acoustically with the emission of a sound.

7. The method according to claim 1, characterized in that, if the position of the point P corresponds to the admissible predefined positions, the following step is performed: calculating, depending on flexing values detected by the two sensor elements (16*a* and 16*b*), the rotation torque which is applied with the wrench to the joint (14) and displaying this torque on a display on the body of the wrench.

8. An electronic torque wrench (10) comprising:

- a body with an axial extension along a longitudinal axis (11);
- a front end provided with a coupling (14) intended to engage the wrench on a joint to be tightened by manual rotation around a rotation axis (15) which is transverse to the longitudinal axis (11);
- a handle (13) along the body for operating the wrench;
- a sensor (16) for detecting a torque applied with the wrench to the coupling (14) and comprising two flex sensor elements (16*a* and 16*b*) which are spaced apart along the longitudinal axis (11);
- an electronic control circuit (17) which is connected to the sensor (16) for receiving signals from it;
- wherein the two flex sensor elements (16*a* and 16*b*) are connected to the said electronic control circuit (17) which is configured to carry out the method according to claim 1.

9. The electronic torque wrench (10) according to claim 8, characterized in that it comprises a display on the body of the wrench and/or an acoustic signalling device which are connected to the electronic control circuit for emitting the error signal.

10. The electronic torque wrench (10) according to claim 8, characterized in that the electronic control circuit comprises an electronic memory (26) containing the positions or the limit values of a range of positions which are predefined as being admissible for the point P along the longitudinal axis (11).

* * * * *